INVENTOR.
Irving M. Archer
BY
Paul E. Mullendore
ATTORNEY

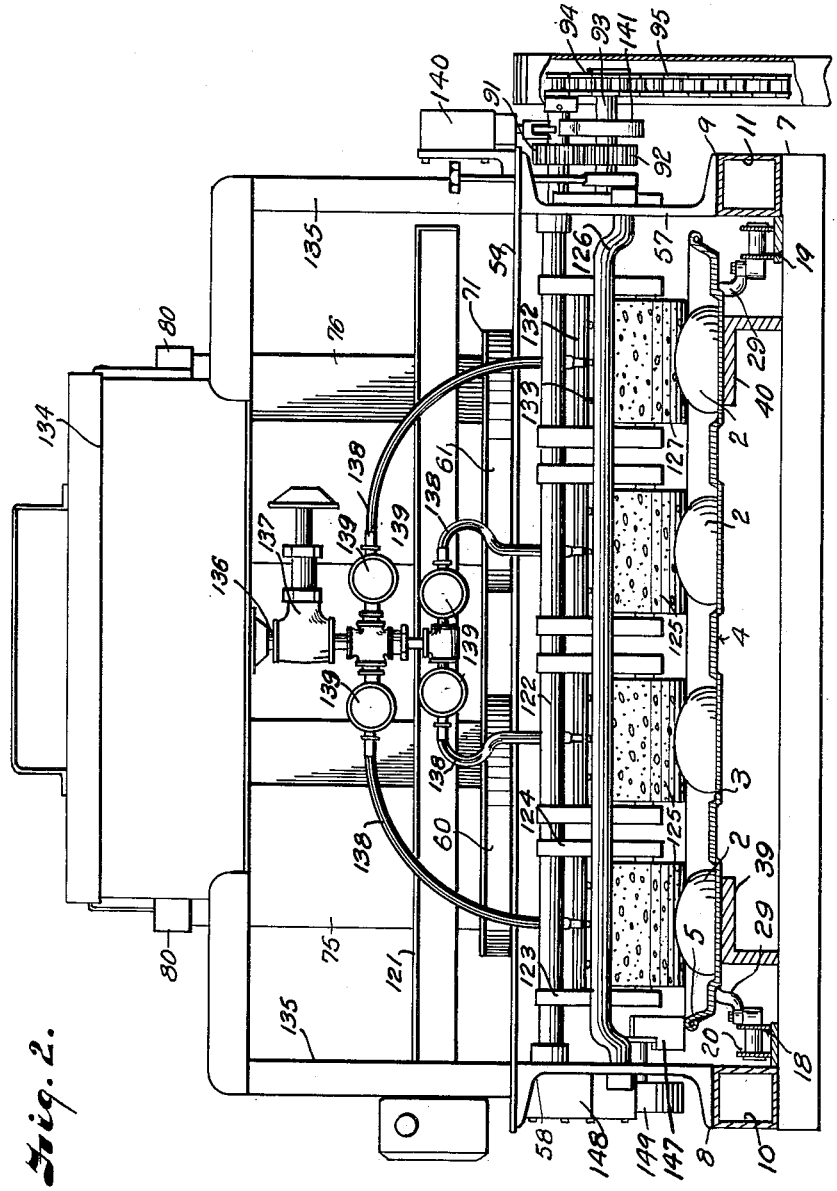

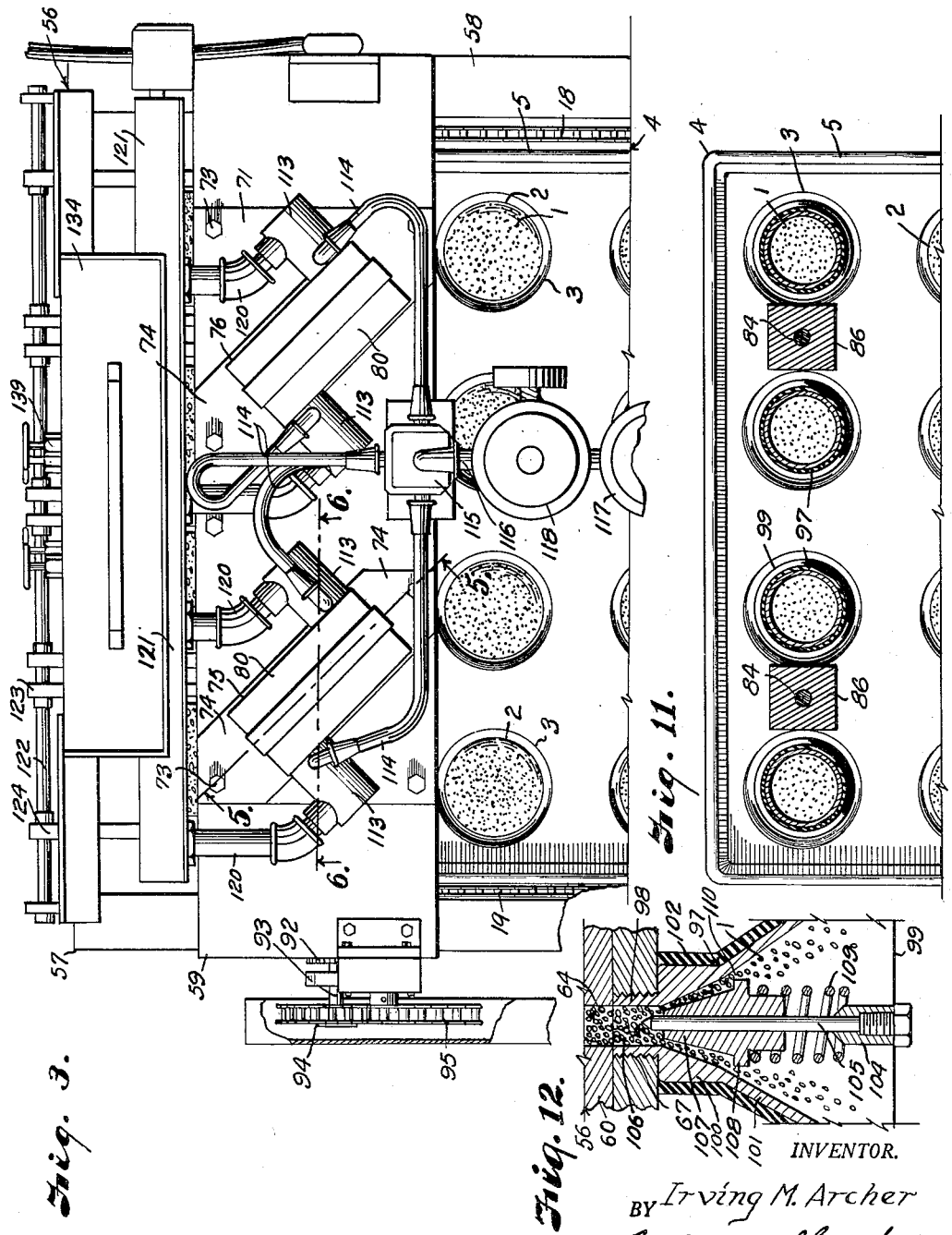

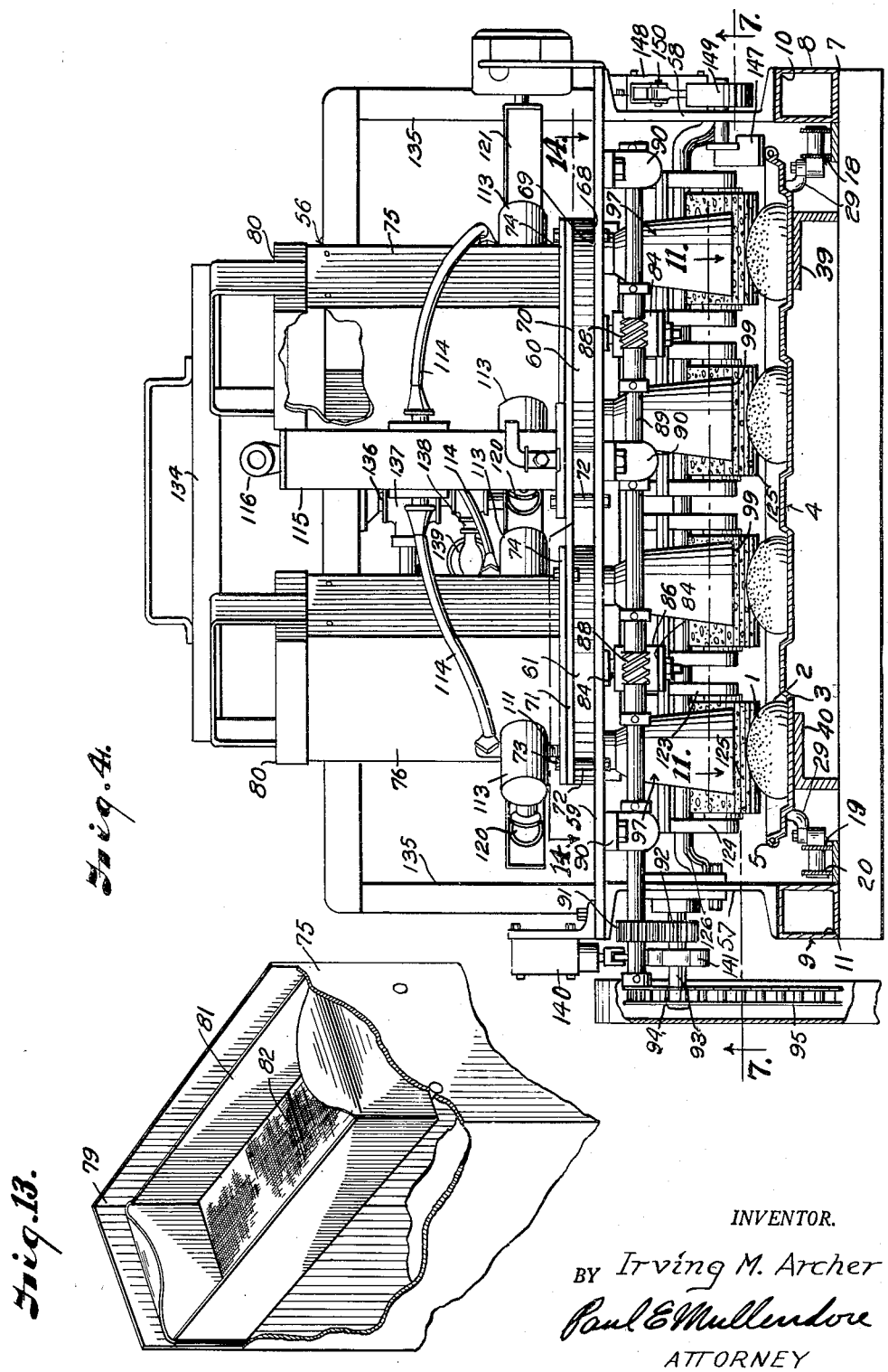

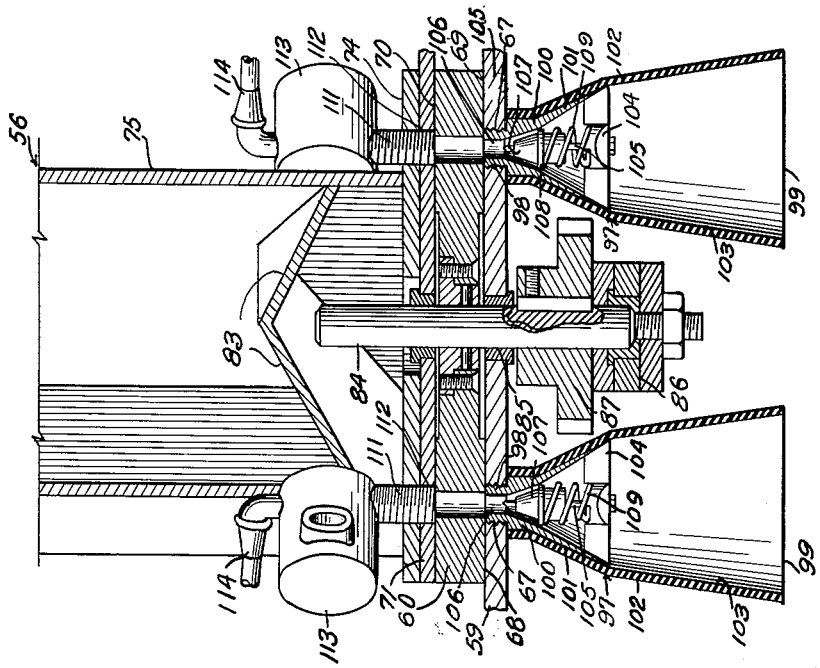

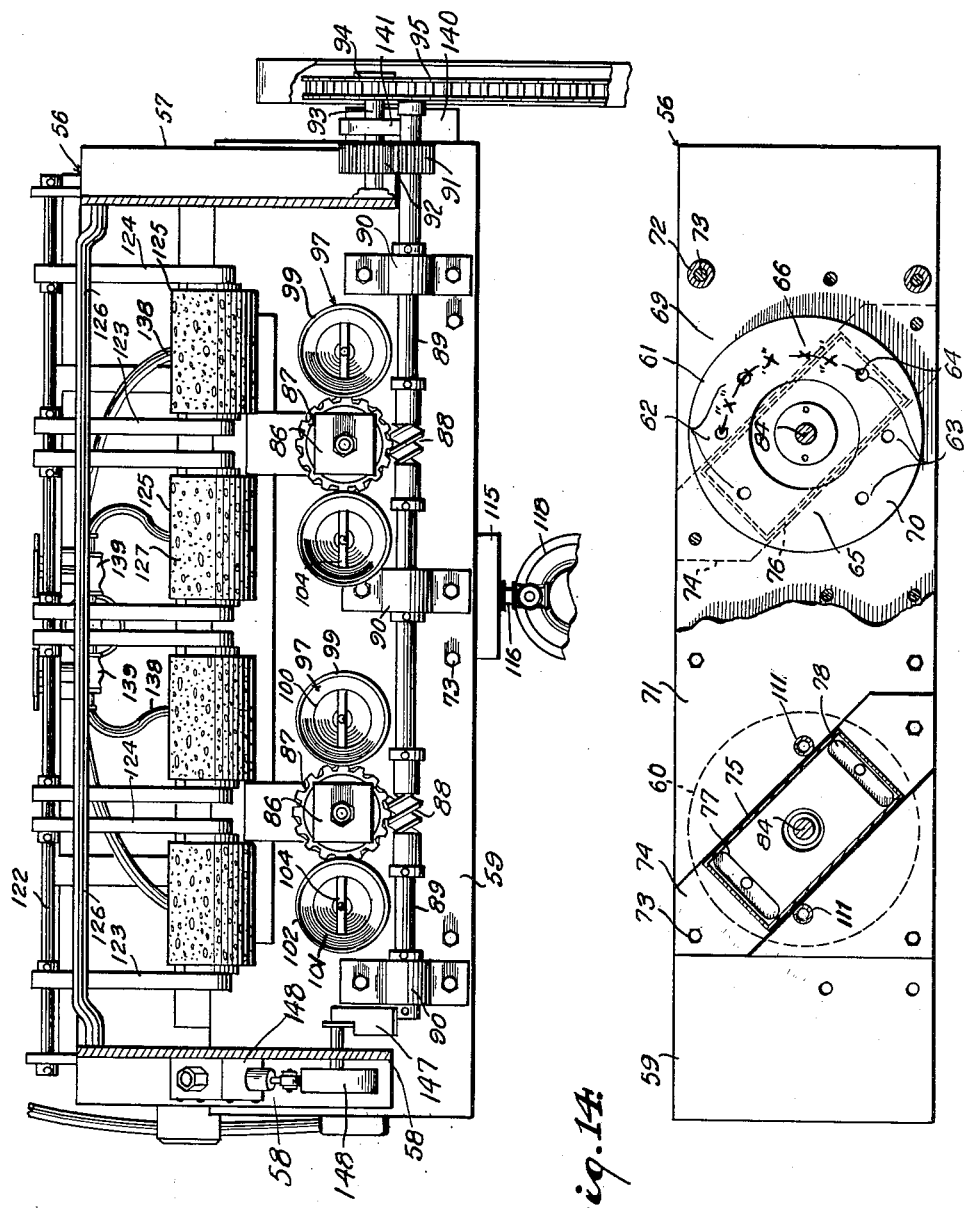

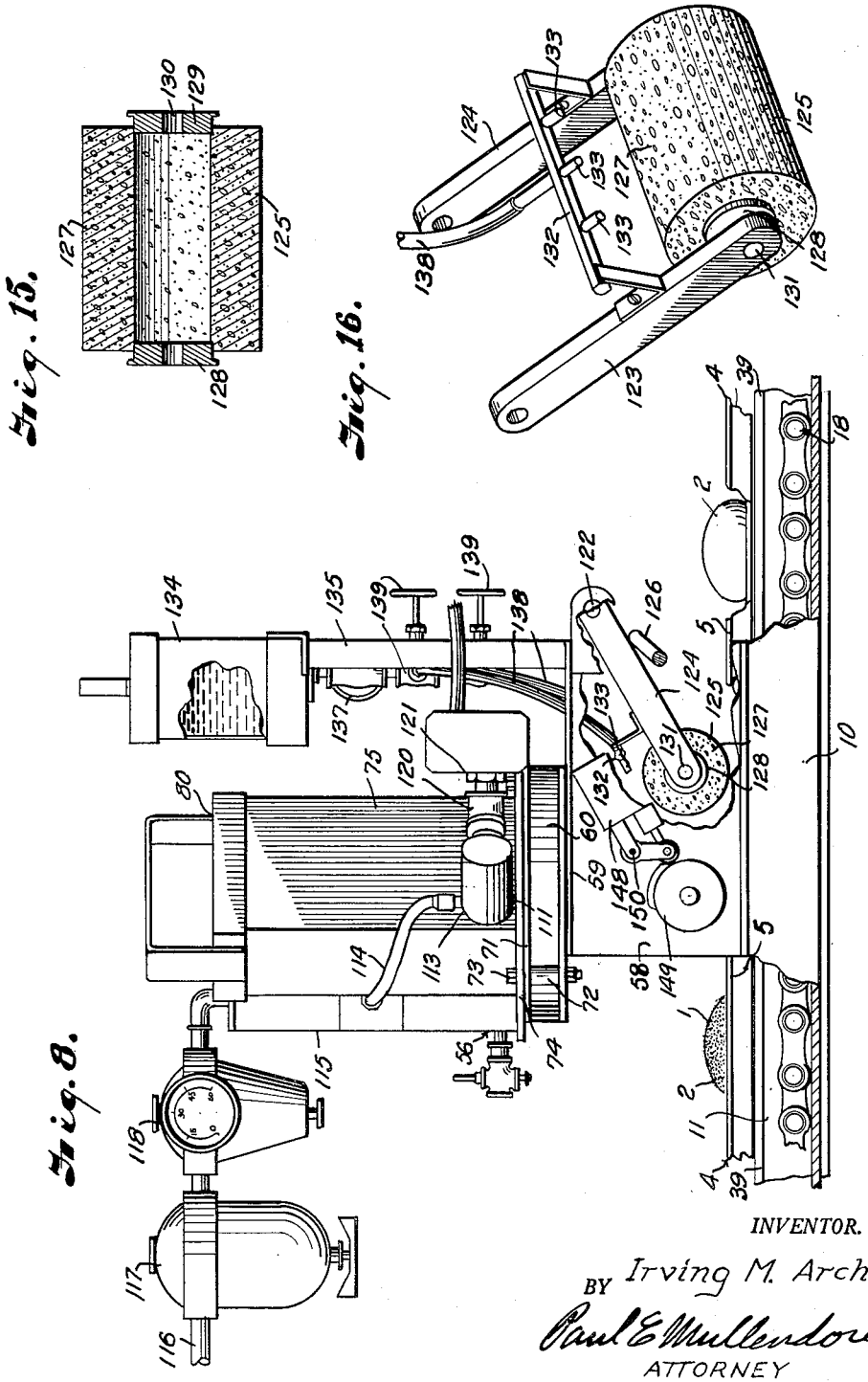

Aug. 8, 1961

I. M. ARCHER 2,995,107

APPARATUS FOR APPLYING EDIBLE PARTICLES
SUCH AS SEEDS TO BAKERY PRODUCTS

Filed Oct. 7, 1957

INVENTOR.
Irving M. Archer
BY
Paul E. Mullendore
ATTORNEY

Aug. 8, 1961   I. M. ARCHER   2,995,107
APPARATUS FOR APPLYING EDIBLE PARTICLES
SUCH AS SEEDS TO BAKERY PRODUCTS
Filed Oct. 7, 1957   9 Sheets-Sheet 9

Fig. 10.

INVENTOR.
Irving M. Archer
BY
Paul E. Mullendore
ATTORNEY

United States Patent Office 2,995,107
Patented Aug. 8, 1961

2,995,107
APPARATUS FOR APPLYING EDIBLE PARTICLES
SUCH AS SEEDS TO BAKERY PRODUCTS
Irving M. Archer, Dallas, Tex., assignor, by mesne assignments, to Campbell Taggart Associated Bakeries, Inc., Dallas, Tex., a corporation of Delaware
Filed Oct. 7, 1957, Ser. No. 688,574
12 Claims. (Cl. 118—16)

This invention relates to a machine for applying edible particles, such as poppy seeds, carroway seeds, sesame seeds, and the like, to bakery goods, for example, buns and the like, prior to baking thereof, and has for its principal object to provide mechanical means for application and distribution of a measured quantity of such seeds to each bun while the buns are automatically conveyed through the machine at high speed.

Other objects of the invention are to provide means for applying the seeds at sufficiently high velocity to imbed them into the dough which forms the buns; to provide means for confining spread of the seeds to the surface area of each unbaked bun on which the seeds are applied; to provide for actuation of the seed applying means in synchronism with movement of the buns through the machine; and to provide a machine for applying measured quantities of seeds simultaneously to a plurality of buns.

A further object of the invention is to provide a machine for applying a liquid to the surface of the unbaked buns to prevent bouncing of the seeds from the dough and to better effect adherence and bedding of the seeds into the dough.

It is also a principal object of the invention to provide the machine with means for feeding pans containing the unbaked buns with the spacing of the buns in the pans being maintained between the pans, and to provide the seed dispensing rotors with groups of pockets, with the pockets in each group spaced apart in accordance with the spacing between the rows of buns in the pan and the groups of pockets spaced apart in accordance with the spacing between the pans whereby the seed dispensing rotors are operated continuously in timed relation with continuous advance of the pans, and to provide for movement of the pans in timed relation with the seed dispensing rotors regardless of the rate at which the pans are presented to the machine.

A further object of the invention is to provide a machine of this character that is of substantially simple construction and at the same time completely automatic in operation.

In accomplishing these and other objects of the invention as hereinafter set out, I have provided improved structure, the preferred form of which is illustrated in the accompanying drawings, wherein:

FIG. 2 is a fragmentary cross section through an upper portion of the machine showing the seed applying mechanism, and particularly the means for applying a liquid to moisten the surface of the dough just prior to application of the seeds.

FIG. 3 is a plan view of the mechanism for applying the seeds.

FIG. 4 is a cross section through the machine showing the seed applying mechanism from the opposite side thereof, parts being broken away to better illustrate the construction.

FIG. 5 is a vertical section through one of the seed applying mechanisms taken on the line 5—5 of FIG. 3 and looking in the direction indicated by the arrows.

FIG. 6 is a vertical section through the seed applying mechanism, taken on the line 6—6 of FIG. 3.

FIG. 7 is a horizontal section through the seed applying mechanisms looking from underneath, as shown by the section line 7—7 of FIG. 4.

FIG. 8 is an end view of the seed applying mechanism.

FIG. 10 is a diagrammatic view showing the wiring and air systems of the machine.

FIG. 11 is a fragmentary section on the line 11—11 of FIG. 4 showing the air nozzles and their relation to the rows of buns.

FIG. 12 is an enlarged sectional view through one of the seed distributing nozzles for blowing the seeds onto a bun.

FIG. 13 is a perspective view of the upper end of one of the seed containers showing a tray therein for screening the seeds when they are placed in the container.

FIG. 14 is a horizontal section on the line 14—14 of FIG. 4.

FIG. 15 is a longitudinal section through one of the moisture applicating rollers.

FIG. 16 is a perspective view of one of the moisture applying units.

Figure 1:
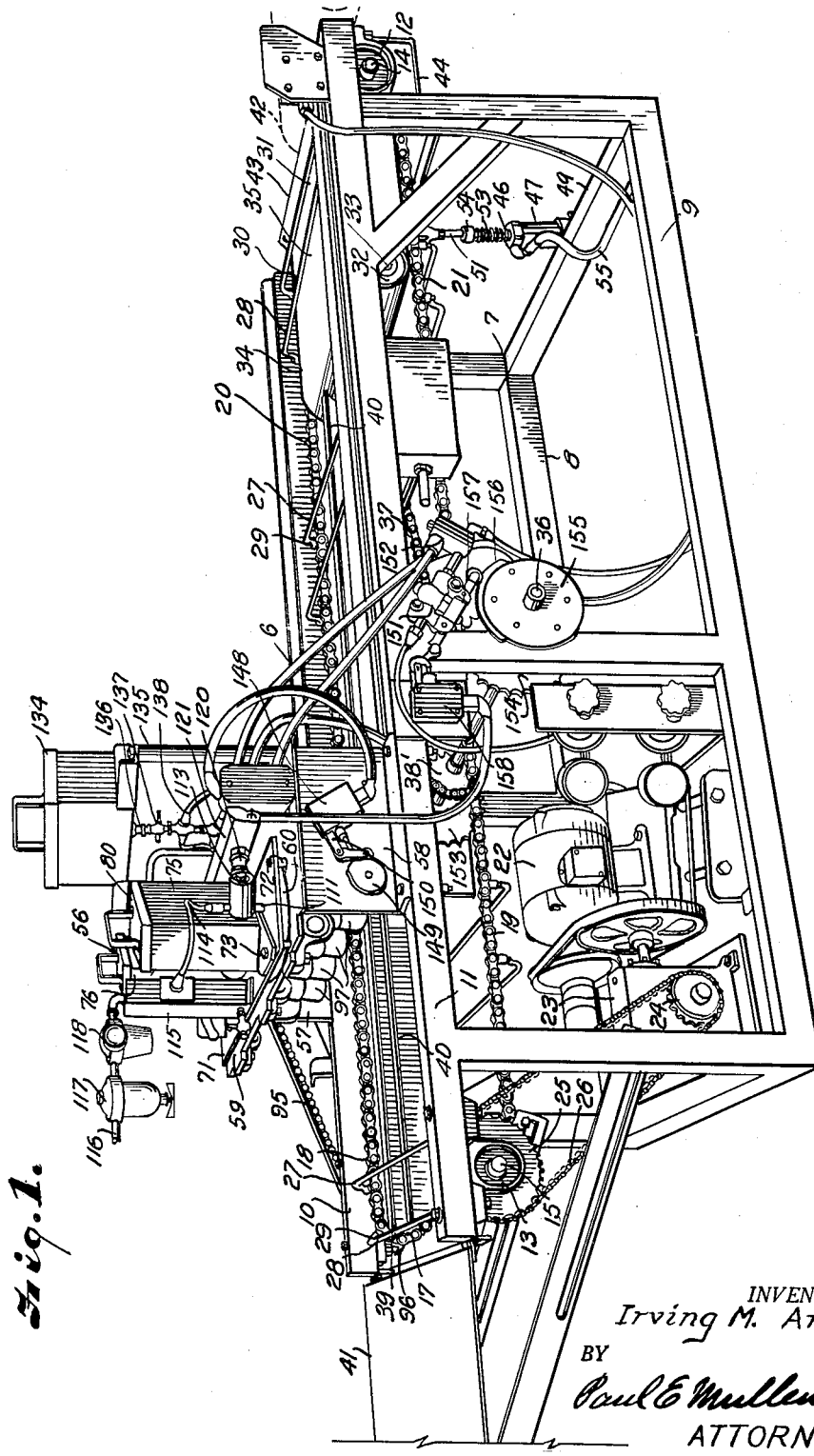
FIG. 1 is a perspective view of a machine embodying the features of the present invention.
Figure 17:
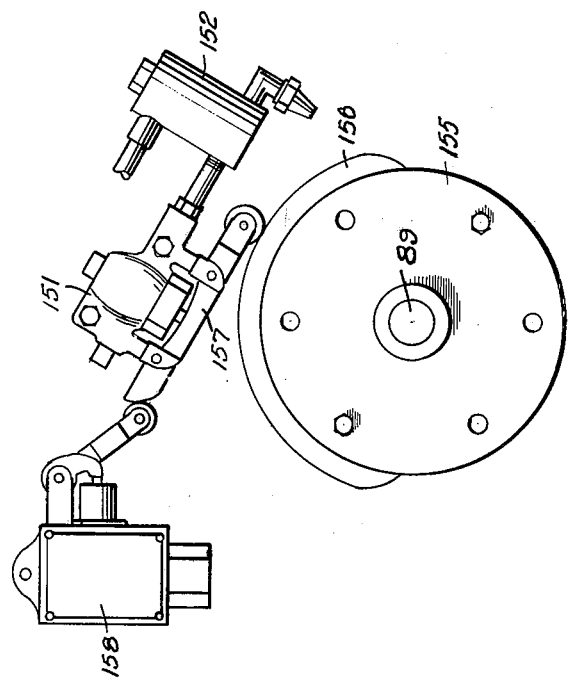
FIG. 17 is a detailed view showing the valve and switch mechanisms for controlling the pan stop illustrated in FIG. 9.

Referring more in detail to the drawings:

In carrying out the invention, the seeds, as indicated at 1, are applied to unbaked buns 2, preferably just prior to the time they are placed in the proof box. The pieces of dough forming the unbaked buns 2 are placed within spaced apart cups or depressions 3 in substantially flat rectangular trays or pans 4. The depressions 3 of each pan 4 are arranged in transverse rows, with the buns being equally spaced apart in the rows and the rows correspondingly spaced apart so that centers of the buns in one row align with the centers of the buns in the other rows. The pans have rims 5 extending from sides and ends thereof in accordance with standard baking pans. These rims 5 are used in carrying pans for advancement one after the other into the seed applying machine 6.

Figure 9:
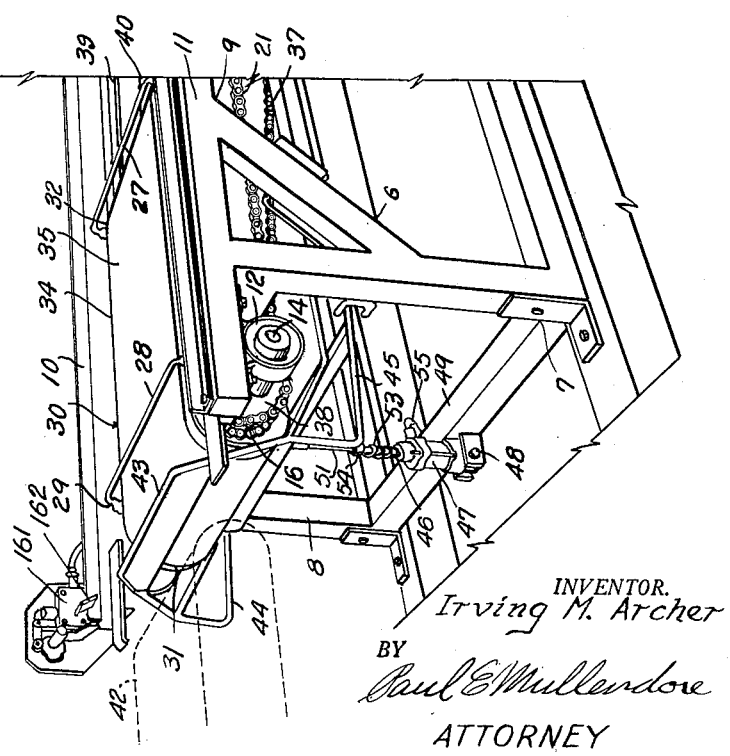
FIG. 9 is a perspective view of the end of the machine in which the pans are inserted, and particularly illustrating the means for controlling entrance of the pans into the machine.

The machine 6 includes an elongated frame 7 composed of spaced apart side members 8 and 9 carrying longitudinal rails 10 and 11 along upper portions thereof. Rotatably mounted at the respective ends of the rails 10 and 11 in journals 12 and 13 are transverse shafts 14 and 15 carrying pairs of spaced apart sprockets 16 and 17. Running over the sprockets 16 and 17 at the respective ends of the machine are endless chain conveyers 18 and 19 having their upper runs 20 extending along the rails 10 and 11. The lower runs 21 of the chain conveyers return along a path at a level below the rails 10 and 11, as best shown in FIGS. 1 and 9.

The chain conveyers carry the baking pans along the length of the machine under power of a motor 22 which drives a speed reducing mechanism 23. The speed reducing mechanism has a power output shaft carrying a sprocket 24 which registers with a driven sprocket 25 on the conveyer shaft 15, the sprockets being connected by an endless chain 26 operating thereover. Certain of the links of the conveyer chains 18 and 19 are interconnected by pairs of rods 27 and 28, with the rods of each pair being spaced apart in accordance with the width of the baking pans, so that the rods 27 engage the respective forward sides of the pans and rods 28 the rear sides of the pans. For convenience, the rods 27 and 28 are carried at a higher elevation than the runs of the conveyer chains, and, therefore, the rods have depending ends 29 attached to the links of the conveyer chains. The pairs of rods are also spaced apart, that is, the rear rod of one pair is spaced from the front rod of a following pair a distance so that the spacing between the centers of the rearmost row of buns in a forward pan are spaced from the centers of the buns in the foremost row of a following pan a distance corresponding to twice the unit spacing of the buns in the pans, for a purpose later to be described.

It is essential that the pans be properly positioned between the rods 27 and 28 to carry the pans substantially level while they are being carried through the machine. This is accomplished by a belt conveyer 30 operating between the conveyer chains. The conveyer belt 30 operates over rollers 31 and 32. The roller 31 is mounted on the shaft 14 intermediate the pair of sprockets 16, and the roller 32 is mounted on a transverse shaft 33 that is carried by the side frame members 8 and 9 forwardly of the shaft 14, whereby the upper run 34 of the belt provides a substantially flat traveling surface 35 for engaging the bottoms of the pans, as later to be described.

The belt 30 is operated at a substantially higher speed than the speed of the chain conveyers from a countershaft 36 by means of a chain 37 operating over a sprocket 38 in driving connection with the roller 31 and a sprocket 38' on the countershaft 36. The pairs of rods 27 and 28 by which the pans are to be carried move around the rear end of the belt conveyer upwardly and forwardly over the upper run 34 of the belt conveyer for a distance greater than the length of the pans, to assure that when a pan is contacted with the upper run 34 of the conveyer belt 30, the belt moves the forward end of the pan into contact with a forward rod 27 of a pair of rods to give room for the rear rod 28 of that pair to move into position for engaging the rear end of the pan, after which the pan is under complete control of the chain conveyer and the traveling surface of the belt merely slips under the pan. The pans, after passing off the front end of the belt conveyer, are moved by the chains along spaced apart rails 39 and 40 through the seed applying mechanism, later to be described, for delivery onto an offtake conveyer or table 41.

The pans 4 may be placed by hand on the rear end of the belt conveyer, or they may be carried thereto by a transfer conveyer 42. In any event, the pans are stopped to assure proper positioning thereof between the pairs of transverse rods by means of a transverse stop 43 that reciprocates over the end of the belt conveyer to stop the pans 4 until one of the foremost rods 27 of a pair of rods of the chain conveyer has passed by and is in position to be engaged by the forward edge of the stopped pan. The stop 43 is carried on arms 44 and 45 that are pivotally connected with the side frames 8 and 9 of the machine, so that raising and lowering the arms 44 and 45 on their pivotal connections with the frame causes the stop 43 to move above the path of the pans as they are delivered by the conveyer 40, and to be lowered below the path of the pans to free the stopped pan. The friction of the traveling surface of the belt conveyer on the bottom of the pan then carries the pan into position to contact the leading rod of one of the pairs of rods carried by the chain conveyer and to permit the rear or trailing rod to move up and into contact with the rear side of the pan.

The arms 44 and 45 are actuated by a pneumatically operated mechanism 46, including a cylinder 47 that is pivotally mounted as at 48 on a cross rail 49 of the frame of the machine and which contains a piston 50 to which is connected a rod 51 pivotally connected with a transverse bar that interconnects the arms 44 and 45. The rod 51 is normally retained in upwardly projected position to lift the transverse stop 43 in stopping relation with the pans by means of a coil spring 53 having one end bearing against the upper end of the cylinder 47 and its upper end against a collar 54 on the rod 51 (see FIGS. 1, 9 and 10). The transverse stop 43 is retracted to allow passage of a stopped pan whenever the pressure medium, such as air, is delivered to the upper portion of the cylinder through a pipe 55 to act upon the upper end of the piston 50 and move the stop 43 downwardly against action of the spring 53. As soon as the pan has cleared the stop 43, the pressure fluid is exhausted from the cylinder 47, so that the spring 53 is effective in again raising the stop 43 to stop the following pan until the next pair of transverse rods are in position to engage the next pan therebetween, as later to be described.

The seed applying mechanism, generally indicated by the numeral 56, is supported near the forward end of the frame 7 on brackets 57 and 58 that are fixed upon the rails 10 and 11. The brackets 57 and 58 carry thereon the ends of a horizontal plate 59 to seat rotors in the form of rotating disks 60 and 61. The disks 60 and 61 having diametrically opposite arcuately arranged groups 62 and 63 of holes 64, the holes 64 being spaced apart a unit space designated "X," FIG. 14, and the endmost holes of the respective groups are spaced apart two "X" units to provide diametrically oppositely disposed blank spaces 65 and 66 in which there are no holes, whereby, when the disks are rotated, as later described, the foremost holes of the groups of holes register with the first row of buns in a pan, the second holes with the second row of buns, and the third holes with the last row of buns, while the blank spaces register with the spaces between that pan and the following pan, as one pan continues its movement out of position and the following pan moves into position. The holes, as stated, and blank spaces therefore align transversely to register with a line of orifices 67 in the plate 59 and which are spaced in the line in accordance with the unit "X."

The disks 60 and 61 have flat lower faces 68 contacting the flat upper face 69 of the plate 59, so that the disks operate as valves to close the orifices 67 while the holes in the disks move into and out of registry therewith. The disks are of a thickness so that the holes 64 are of a size to contain a given quantity of seeds therein, as later described. The upper faces 70 of the disks contact an upper transverse plate 71 that is carried horizontally in spaced relation with the horizontal plate 59 on spacers 72. The plate 71 and spacers 72 are retained in position by fastening devices such as bolts 73 that extend through the plates 59 and 71, spacing sleeve 72, and laterally directed ears 74 on seed containers or hoppers 75 and 76 that are carried over the respective disks upon the upper plate 71. The upper plate 71 has diametrically opposite slots 77 and 78 that are offset relatively to the orifices 67 but are adapted to register with the holes 64 as the holes move thereunder toward the position where they register with the orifices, and wherethrough the slots charge the holes with seed.

The seed containers are preferably arranged angularly with respect to the forward movement of the pans, whereby the seeds are deposited in the respective holes just prior to their movement into registry with the discharge orifices 67, as best shown in FIGS. 1, 3, 4 and 14. The seed containers 75 and 76 have open tops 79, preferably closed by removable lids 80. Positioned within the open tops of the containers are trays 81 having screen bottoms 82 for screening the seeds as they are poured into the containers. The lower ends of the containers have ramps 83 sloping downwardly toward the respective slots 77 and 78 to assist in filling of the holes in the disks. The disks are affixed to stub shafts 84 that extend through openings 85 of the horizontal plate 59 and are journaled in bearing blocks 86. The stub shafts carry worm gears 87 by which the disks are rotated. The worm gears 87 are driven by worms 88 carried on a transverse shaft 89. The shaft 89 has rotatable support within bearing brackets 90 that are attached to the under side of the horizontal plate 59, as best shown in FIG. 7. One end of the shaft 89 carries a gear 91 meshing with a gear 92 on a stub shaft 93 which is carried by the bracket 57. The stub shaft 93 in turn carries a sprocket 94 that is driven by a chain 95 operating over a sprocket 96 on the shaft 15 (see FIGS. 1, 2, 3, 4 and 7).

It is obvious that the disks 60 and 61 are rotated in timed relation with movement of the pans 4 by the conveyer chains 18 and 19, so that when the holes 64 in the disks register with the orifices 67 in the plate, a row of buns 2 is in registry thereunder, and when the orifices 67 are closed by the blank portions 65 and 66 of the disks, one pan 4 is moving out of position and the following pan 4 is moving into position where the first row of buns 2 registers with the orifices 67. In this way, the disks 60 and 61 and chain conveyer are operated continuously and yet seeds are discharged through the orifices 67 only when buns 2 are in position to receive them.

In order to guide the discharge of seeds and to confine the seeds to the upper surfaces of the buns, each orifice connects with a depending guard or shield 97. The guards or shields 97 have threaded necks 98 engaging within threads of the orifices 67, so that the guards are carried from the horizontal plate 59 and supported with the lower circumferential edges 99 of the guards carried in close relation with the buns as they pass thereunder, as shown in FIG. 4.

The guards or shields are preferably of flexible material, and, therefore, are preferably formed of two parts, whereby the threaded necks 98 are on rigid members 100 having outwardly flaring skirt portions 101 over which members 102 of flexible material are applied and retained thereon when the threaded necks of the members 101 are turned within the orifices 67. The members 102 have skirt portions 103 that flare outwardly at a lesser angle than the flare of the skirt portions 101, so that the terminal edges 99 thereof are substantially the diameter of the buns.

Extending transversely within the skirt portions 101 of the rigid members 100 are bars 104 carrying upwardly extending guide pins 105 that terminate within ports 106 of the threaded necks 98. Sleeved on the pins are conical spreaders 107. The spreaders 107 carry annular flanges 108 at the base thereof which engage within the skirt portions 101 to close flow through the ports 106. The spreaders 107 are resiliently retained with the flanges 108 thereof closing the ports by coil springs 109 having one end seated on the bars 104 and the other end engaging under the flanges 108.

In order that the seeds may be discharged with sufficient velocity and to effect distribution thereof by blowing them through an annular passageway 110 that opens up between the flanges 108 of the spreaders 107 and the inner faces of the skirts 101, the upper horizontal plate 71 carries nozzles 111 which are threaded into openings 112 directly over the orifices 67. The nozzles 111 have heads 113 which are connected with air supply conduits 114 leading from a common air supply manifold 115. The air is supplied to the manifold 115 through a pipe 116 leading from a source of air supply (not shown) to the manifold 115 through an air filter 117 and a pressure regulator and indicating device 118 (FIG. 1). The heads 113 of the nozzles each contain solenoid operated valving elements (not shown) which normally close the ports in the nozzles 111, but which will open responsive to closure of an electrical circuit through the solenoids 119 of the respective valves, as later to be described. The wiring for the solenoids 119 extends through tubular conduits 120 that connect the nozzle heads 113 with a transverse angle 121 located at the rear side of the seed containers, as best shown in FIG. 3.

If the unbaked dough is sufficiently moist, the seeds will imbed therein, however, it is found desirable to provide the machine with means for moistening the upper surfaces of the buns just prior to their passage into the seed applying mechanism. Extending transversely of the brackets 57 and 58 is a rod 122 carrying pairs of forwardly extending arms 123—124 in front of each seed applying station. Carried between the arms are moisture applying rollers 125 which are adapted for rolling contact with the upper surfaces of the buns. The pairs of arms 123 and 124 are supported by a transverse stop bar 126, so that the rollers are carried above the path of the pans and in position to exert a minimum pressure on the tops of the buns. The rollers are best illustrated in FIGS. 15 and 16. As shown in these figures, each roller comprises a hollow cylindrical sponge 127 having porosity to contain moisture for application to the buns. The ends of the cylindrical rollers are closed by plugs 128 and 129 having axial openings 130 for passing shafts 131 therethrough by which the rollers are mounted on the pairs of arms 123 and 124. Also carried by each pair of arms is a manifold 132 having nozzles 133 for discharging water onto the surface of the rollers. The water is supplied to the manifolds from a storage tank 134 which is carried at a substantially high level above the brackets 57 and 58 on posts 135 that extend upwardly from the respective brackets. Connected with the bottom of the storage tank is a duct 136 having a main control valve 137 therein for controlling flow of water from the tank. Connected with the duct 136 at the discharge side of the control valve 137 are flexible conduits 138 leading to the respective manifolds 132. Connected into the conduits 138 are regulating valves 139 by which water may be caused to drip from the nozzles 133 onto the rollers in quantity desired to supply the necessary moisture to the buns.

As above stated, the pans are conveyed in timed relation with operation of the seed applying mechanisms. Consequently, the valves controlling discharge through the nozzles 111 are actuated by a timing switch 140 which is operated by a cam 141 on the stub shaft 93, previously referred to. When the cam 141 closes the switch 140, a circuit is closed through the solenoids of the air nozzle valves by way of a branch conductor 142 connected with a main line conductor 143 and with one terminal of all of the solenoids 119. The other terminals of the solenoids are connected by a conductor 145 with the other main conductor 146. However, the valves are not operated except when a pan is in proper position under the seed applicators, and this is determined by a feeler arm 147 that operates a switch 148. The switch 148 is connected into the branch conductor 142 in series with the switch 140 and is mounted on the bracket 57 (FIG. 1). The feeler arm 147 actuates a segment 149 that contacts an actuating arm 150 of the switch. Thus the applicators do not operate unless both switches 140 and 148 are closed. Since no air can be discharged through the nozzles, the spreaders hold back the seeds.

The flow of air to the cylinder 47 which actuates the transverse stop 43 is controlled by a main valve 151 and a solenoid stop valve 152 that are connected in the air supply conduit 55 previously described and which leads from the air supply, also previously referred to. The main and stop valves 151 and 152 are located on one of the side frames near an end of the countershaft 36. The countershaft 36 is driven from the lower runs 21 of the conveyer chains 18 and 19 by sprockets 153 and 154 mounted thereon and having their teeth meshing with the links in the lower runs 21 of the conveyer chains to drive the countershaft 36 in timed relation with the conveyer chains. Fixed on the outer end of the countershaft 36 adjacent the valve 151 is a cam 155 having a high lobe 156 for engaging a lever 157 of the valve 151 for passing air through the conduit 55 to the cylinder 47. The air acting on the piston 50 causes the transverse stop 43 to withdraw and pass the pan detained thereby onto the conveyor belt 30. The cam actuated lever 157 also actuates a switch 158 that is also mounted on the side frame of the machines and which closes circuit to the solenoid for actuating the stop valve 152 by way of branch conductors 159 and 160 that are connected with the main line conductors. It is essential, however, that a pan be in position to be passed onto the conveyer belt 30. This is determined by an electric switch 161 having a feeler arm 162 that is pivotally carried at the entry end of the machine to engage the pans as they are presented by the conveyer 30. If a pan is present, the feeler arm 162 contacts the pan and closes the switch 161 to complete a circuit from the main conductor 143, branch conductor 160, switch 162, solenoid winding 163 for the stop valve 152, switch 158, and branch conductor 159, to the other main line conductor 146. As above stated, with this arrangement the entrance of the pans is timed with relation to the pairs of conveyer rods to engage the pans therebetween and carry them in orderly arrangement to the seed applying mechanism.

In using the apparatus constructed and assembled as described, the pans 4 containing the unbaked buns 2 are placed on the conveyor 42 and are presented thereby to the fast moving conveyor belt 30, providing the transverse stop 43 is down. If the transverse stop 43 is up and blocking advance of the pan, then the pairs of conveyor rods 27 and 28 are not in proper position to engage a pan therebetween. The pan is held back until the foremost rod 27 of a pair has passed, whereupon the switch 158 is closed and the switch 161 is also closed. Therefore, the circuit is closed from the main conductor 146, branch conducter 159, switch 158, solenoid winding 163, switch 161, and branch conductor 160, to the main conductor 143. Energization of the air valve 152 and simultaneous opening of the air valve 151 by the cam 155, which is operated in timed relation with the conveyor chains 19 and 20, admits air through the pipe 55 to the air cylinder 47. Upon admission of the air, the air acts on the piston 50 to move the piston 50 downwardly in the cylinder against action of the spring 53 to retract the transverse stop 43. Since the first rod of a pair has been carried over the fast moving belt 30, the pan will move thereon and be advanced until the forward side is stopped by the foremost transverse rod 27, whereupon the rear rod 28 of a pair of rods 27 and 28 moves into position to engage the rear of the pan 4 to cooperate with the forward rod 27 in carrying the pan along the rails 40 and under the seed applying mechanism 56.

As the buns are carried under the porous rollers 125, the moisture therein is applied to the upper surface of the buns 2 to soften them sufficiently to cause the seed to imbed. The water supplying the moisture is delivered from the tank 134 through the main manually controlled valve 137 and through the conduits 138 under control of the hand valves 139 for flow to the manifolds and discharge through the nozzles 133 in the form of drops which drip upon the surface of the porous rollers and are absorbed in the pores thereof. The rollers roll over the rounding tops of the buns, and the resiliency thereof is such as to complete coverage of the top surfaces of the buns.

As soon as the pan reaches the arm 147 which actuates the switch 148, the switch 148 will be closed, and since the switch 140 is operated in timed relation with movement of the conveyor chains 19 and 20, the segment 149 will close the switch 148, whereupon a circuit is established from the main conductor 143, branch conductor 145, through all of the solenoids 119 of the valves 113, switches 148 and 140, and branch conductor 142 to the main conductor 143. With the valves opening, jets of air blow through the nozzles 111 to discharge measured quantities of seeds then contained in the holes 64 that are in registry with the nozzles 111 and ports 106. The blasts of air being discharged will move the spreaders 107 downwardly under action of the springs 109 to open up the annular passages 110 to effect spread of the seeds. The seeds, being contained within the shields 97, will be distributed onto the buns with sufficient force to imbed them into the moistened dough. The rotors 60 and 61, that contain the holes by which the seeds are measured, rotate continuously with movement of the conveyor chains 18 and 19, and a following set of holes registers with the nozzles 111 by the time the second row of buns passes under the shields.

As above stated, the rotors 60 and 61 are driven by the chain 95, gears 92 and 91, transverse shaft 89, worms 88 and worm gears 87. When the first pan has passed the applicators, the arm 147 will automatically open the switch 148 to prevent further discharge of air through the nozzles, even though the switch 140 has been opened by the cam 141. During this interval, the blank spaces 65 and 66 of the disks 60 and 61 will have moved under the discharge slots 77 of the hoppers and under the nozzles 111.

As soon as the following pan engages the arm 147, the switch 148 closes, along with the switch 140, to again render the seed applicating mechanism effective in applying the seeds to the buns in the rows of the pan then in position. After application of the seeds, the pans continue their movement by the conveyor chains and are discharged onto the offtake conveyor or table 41.

From the foregoing, it is obvious that I have provided an apparatus for applying edible seeds and similar particles to bakery products, such as buns and the like. It is also obvious that the seeds are mechanically applied in measured quantities in such a manner that the seeds are all confined to the area of the buns or the like onto which they are to be distributed, so that there is no waste and a required coating of seeds is assured on every bun that is passed through the apparatus.

While I have particularly referred to the application of seeds to buns throughout the specification and claims, it is obvious that any particles may be distributed in like manner onto other types of bakery products, such as rolls, bread, cookies, cakes, and the like, and all of which are within the scope of the invention.

What I claim and desire to secure by Letters Patent is:

1. An apparatus for applying seeds and similar edible particles to bakery products such as buns while contained in pans of the type having transverse rows of individual pockets each adapted to contain a bun, said apparatus including a support having discharge openings corresponding in spacing with the buns in the transverse rows, means for measuring and carrying quantities of seeds into registry with the discharge openings, spring pressed valves normally closing the discharge openings, a conveyor for carrying the pans in continuous movement to advance the rows of buns in a pan under the seed discharge openings, jet means for discharging jets of air into the measured quantities of seeds contained in said apertures when registered with the discharge openings to effect opening of the spring pressed valves and discharge of the seeds under substantial velocity onto the buns, means for actuating the jet means in sequence with registry of the rows of buns in a pan under said seed measuring means, and means for controlling said actuating means responsive to presence of a pan under said measuring means.

2. An apparatus for applying seeds and similar edible particles to bakery products such as buns while contained in pans of the type having transverse rows of individual pockets each adapted to contain a bun, said apparatus including means for moistening top surfaces of the buns, a support having discharge openings corresponding in spacing with the buns in the transverse rows, means for measuring and carrying quantities of seeds into registry with the discharge openings, spring pressed valves normally closing the discharge openings, a conveyor for carrying the pans in continuous movement to advance the rows of buns in a pan under the seed discharge openings, jet means for discharging jets of air into the measured quantities of seeds contained in said apertures when registered with the discharge openings to effect opening of the spring pressed valves and discharge of the seeds under substantial velocity to effect bedding of the seeds into the moistened top surface of the buns, means for actuating the jet means in sequence with registry of the rows of pockets in a pan under said seed measuring means, and means for controlling said actuating means responsive to presence of a pan under said measuring means.

3. An apparatus for applying seeds and similar edible particles to bakery products such as buns while contained in baking pans of the type having transverse rows of individual pockets each adapted to contain a bun, said apparatus including rotatable disks each having diametrically opposed arcuate series of apertures for containing quantities of seeds for the respective buns in a transverse row, stationary member closing bottoms of the apertures during movement of the disks when bringing the apertures of the disks into registry with the discharge openings in the said stationary member, said discharge openings corresponding in spacing with the buns in the transverse rows, spring pressed valves normally closing the discharge openings to retain the seeds in said apertures when the apertures reach the discharge openings, said apertures in each series corresponding to the number of transverse rows in each pan, a conveyor for carrying the pans in continuous movement to advance the transverse rows of buns in a pan under the seed discharge openings, jet means for discharging jets of air into the measured quantities of seeds contained in said apertures when in registry with the discharge openings to effect opening of the spring pressed valves and discharge of the seeds under substantial velocity onto the buns, means for actuating the jet means in sequence with registry of the transverse rows of pockets in a pan under said discharge openings, and means for controlling said actuating means responsive to presence of a pan under said measuring means.

4. An apparatus for applying seeds and similar edible particles to bakery products such as buns while contained in pans of the type having transverse rows of individual pockets each adapted to contain a bun, said apparatus including rotatable disks each having diametrically opposed arcuate series of apertures for containing quantities of seeds for the respective buns in a transverse row, said series of apertures being spaced apart to correspond with a predetermined spacing of the pans, stationary member closing bottoms of the apertures during movement of the disks when bringing the apertures of the disks into registry with discharge openings in said stationary member, said discharge openings corresponding in spacing the buns in the transverse rows, spring pressed valves normally closing the discharge openings to retain the seeds in said apertures when the apertures reach the discharge openings, said apertures in each series corresponding to the number of transverse rows in each pan, a conveyor for carrying the pans in said predetermined spacing and in continuous movement to advance the transverse rows of buns in a pan under the seed discharge openings, jet means for discharging jets of air into the measured quantities of seeds contained in said apertures when in registry with the discharge openings to effect opening of the spring pressed valves and discharge of the seeds under substantial velocity onto the buns, means for actuating the jet means in sequence with registry of the transverse rows of pockets in a pan under said discharge openings, means for controlling said actuating means responsive to presence of a pan under said measuring means, and means for feeding the pans onto the conveyor in accordance with said predetermined spacing of the pans.

5. An apparatus for applying seeds and similar edible particles to bakery products such as buns while contained in the baking pans and prior to baking, said apparatus including a hopper for containing a supply of the seeds and having an outlet in the bottom thereof, a seed carrier having a hole therethrough for providing a pocket adapted to contain therein the quantity of seeds for a bun, means for supporting the seed carrier under the hopper for carrying the pocket into and out of registry with the seed outlet of the hopper, stationary means on the under side of the seed carrier to close the under side of said hole and having an orifice offset from the outlet of the hopper and through which the seeds are discharged onto the bun, an inverted funnel shaped shield suspended from the orifice and terminating over the bun for limiting spread of the seeds to the upper surface of the bun, a seed spreader cooperating with the inverted funnel to provide an annular seed discharge passageway around said spreader in said shield, yieldable means normally supporting the seed spreader in closing relation with the orifice to retain the seeds in said pocket, and a nozzle registering with the orifice for discharging a jet of air through the pocket to unseat the spreader against action of said yielding means to blow the seeds onto the buns.

6. An apparatus for applying seeds and similar edible particles to bakery products such as buns, said apparatus including means for wetting the buns, a hopper for containing a supply of the seeds and having an outlet in the bottom thereof, a seed carrier having a hole therethrough for providing a pocket adapted to contain therein the quantity of seeds for a bun, means for supporting the seed carrier under the hopper for carrying the pocket into and out of registry with the seed outlet of the hopper, stationary means on the under side of the seed carrier to close the under side of said hole and having an orifice offset from the outlet of the hopper and through which the seeds are discharged, an inverted funnel shaped shield suspended from the orifice for limiting spread of the seeds, a seed spreader in said shield, a downwardly and outwardly tapering seat member connected with the shield to seat the spreader for normally closing the orifice to retain the seeds in said pocket, means for yieldably retaining said spreader in seated position, means for carrying the buns first under the moistening means and then under the shield, and a nozzle registering with the orifice for discharging a jet of air through the pocket to unseat the spreader and for forceably discharging and bedding the seeds into the wetted surface of the bun.

7. An apparatus for applying seeds and similar edible particles to bakery products such as buns while contained in the baking pans and prior to baking, said apparatus including a hopper for containing the seeds and having spaced apart outlets in the bottom thereof, a conveyer for carrying the pans under said hopper, a seed carrying rotor having diametrically opposed arcuately grouped holes for providing pockets adapted to contain quantities of seeds, said rotor having blank spaces intermediate the arcuate groups of holes, means for supporting the seed carrying rotor under the hopper for successive movement of the pockets into and out of registry with the seed outlets of the hopper, a stationary plate on the under side of the seed carrier to close said holes and having orifices offset from the outlets of the hopper and through which the seeds are discharged onto the buns, inverted funnel shaped shields suspended from the orifices for limiting spread of the seeds, seed spreaders in said shields and yieldably closing the orifices to retain the seeds in said pockets, and nozzles registering with the orifices for discharging jets of air into the holes as they are registered with the orifices for unseating the spreaders and for blowing the seeds onto the buns.

8. An apparatus for applying seeds and similar edible particles to bakery products such as buns while contained in the baking pans and prior to baking, said apparatus including a hopper for containing the seeds and having spaced apart outlets in the bottom thereof, a conveyer for carrying the pans under said hopper, a seed carrying rotor having diametrically opposed arcuately grouped holes for providing pockets adapted to contain quantities of seeds, said rotor having blank spaces intermediate the arcuate groups of holes, means for supporting the seed carrying rotor under the hopper for successive movement of the pockets into and out of registry with the seed outlets of the hopper, a stationary plate on the under side of the seed carrier to close said holes and having orifices offset from the outlets of the hopper and through which the seeds are discharged onto the buns, inverted funnel shaped shields suspended from the orifices for limiting spread of the seeds, seed spreaders in said shields and yieldably closing the orifices to retain the seeds in said pockets, nozzles registering with the orifices for discharging jets of air into the holes as they are registered with the orifices for unseating the spreaders and for blowing the seeds onto the buns, and means spacing the pans on the conveyor whereby the blanks of said seed carrying rotor are closing the orifices when one pan is moving out of position under the shields and the following pan is moving into position.

9. An apparatus for applying seeds and similar edible particles to bakery products such as buns while contained in the baking pans and prior to baking, said apparatus including a hopper for containing the seeds and having spaced apart outlets in the bottom thereof, a conveyer for carrying the pans under said hopper, a seed carrying rotor having diametrically opposed arcuately grouped holes for providing pockets adapted to contain quantities of seeds, said rotor having blank spaces intermediate the arcuate groups of holes, means for supporting the seed carrying rotor under the hopper, means for rotating the seed carrying rotor in timed relation with the conveyor to fill the holes with seeds, a stationary plate on the under side of the seed carrier to close said holes and having orifices offset from the outlets of the hopper and through which the seeds are discharged onto the buns, shields suspended from the orifices for limiting spread of the seeds, seed spreaders in said shields and yieldably closing the orifices to retain the seeds in said pockets, nozzles registering with the orifices for discharging jets of air into the holes as they are registered with the orifices for unseating the spreaders and for blowing the seeds onto the buns, and means spacing the pans on the conveyer whereby the blanks of said seeds carrying rotor are closing the orifices when one pan is moving out of position under the shields and the following pan is moving into position.

10. An apparatus for applying seeds and similar edible particles to bakery products such as buns while contained in the baking pans and prior to baking, said apparatus including a hopper for containing the seeds and having spaced apart outlets in the bottom thereof, a conveyer for carrying the pans under said hopper, a seed carrying rotor having diametrically opposed arcuately grouped holes for providing pockets adapted to contain quantities of seeds, said rotor having blank spaces intermediate the arcuate groups of holes, means for supporting the seed carrying rotor under the hopper, means for rotating the seed carrying rotor in timed relation with the conveyor to fill the holes with seeds, a stationary plate on the under side of the seed carrier to close said holes and having orifices offset from the outlets of the hopper and through which the seeds are discharged onto the buns, shields suspended from the orifices for limiting spread of the seeds, seed spreaders in said shields and yieldably closing the orifices to retain the seeds in said pockets, nozzles registering with the orifices for discharging jets of air into the holes as they are registered with the orifices for unseating the spreaders and for blowing the seeds onto the buns, means for supplying the air to the nozzles under pressure, valves controlling the air supply, means actuating the valves in timed relation to the conveyer, and means spacing the pans on the conveyer whereby the blanks of said seed carrying rotor are closing the orifices when one pan is moving out of position under the shields and the following pan is moving into position.

11. An apparatus for applying seeds and similar edible particles to bakery products such as buns while contained in the baking pans and prior to baking, said apparatus including a hopper for containing the seeds and having spaced apart outlets in the bottom thereof, a conveyer for carrying the pans under said hopper, a seed carrying rotor having diametrically opposed arcuately grouped holes for providing pockets adapted to contain quantities of seeds, said rotor having blank spaces intermediate the arcuate groups of holes, means for supporting the seed carrying rotor under the hopper, means for rotating the seed carrying rotor in timed relation with the conveyer to fill the holes with seeds, a stationary plate on the under side of the seed carrier to close said holes and having orifices offset from the outlets of the hopper and through which the seeds are discharged onto the buns, shields suspended from the orifices for limiting spread of the seeds, seed spreaders in said shields and yieldably closing the orifices to retain the seeds in said pockets, nozzles registering with the orifices for discharging jets of air into the holes as they are registered with the orifices for unseating the spreaders and for blowing the seeds onto the buns, means for supplying the air to the nozzles under pressure, valves controlling the air supply, means actuating the valves in timed relation to the conveyer, means spacing the pans on the conveyer whereby the blanks of said seed carrying rotor are closing the orifices when one pan is moving out of position under the shields and the following pan is moving into position, and pan sensing means for determining presence of a pan under the shields for controlling actuation of the valves.

12. An apparatus for applying seeds and similar edible particles to bakery products such as buns while contained in pans of the type having transverse rows of individual pockets each adapted to contain a bun, said apparatus including means for measuring quantities of seeds for the respective buns in a row and having individual outlets for each measured quantity of seeds, shielding means having connections with the respective outlets and having annular potrions flaring outwardly from said connections and spaced apart in accordance with the spacing of the pockets, a conveyor for carrying the pans in continuous movement to advance the rows of buns in a pan under the said seed measuring means, jet means for discharging jets of air into the measured quantities of seeds, a conical element at each connection and having a flange encircling the base portion thereof for directing the seed within limits of said shielding means, means for reciprocably mounting the conical elements within the said connections, means for actuating the jet means in sequence with registry of the transverse rows of pockets in a pan under said shielding means, means for controlling said actuating means responsive to presence of a pan under said shielding means, and a spring resiliently supporting the conical element with said flange in valving contact with the shielding means and being yieldable responsive to pressure of the air from the jet means for passage of the seeds from the measuring means.

References Cited in the file of this patent

UNITED STATES PATENTS

| | | |
|---|---|---|
| 1,303,599 | Salerno | May 13, 1919 |
| 1,658,070 | Arehart | Feb. 7, 1928 |
| 2,666,410 | Budny | Jan. 19, 1954 |
| 2,808,021 | Kollman | Oct. 1, 1957 |

OTHER REFERENCES

| | | |
|---|---|---|
| 341,854 | Great Britain | Jan. 19, 1931 |
| 140,780 | Australia | Apr. 11, 1951 |